Figure 1:
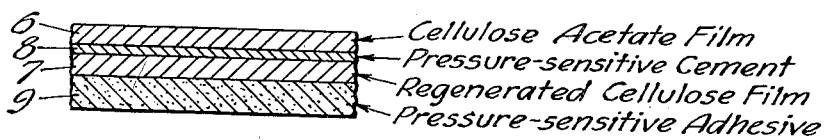

Nov. 9, 1948.  J. W. PEARSON  2,453,258
PRESSURE-SENSITIVE ADHESIVE SHEET
Filed April 6, 1946

Inventor
John William Pearson
Carpenter, Abbott, Coulter & Kinney
Attorneys

Patented Nov. 9, 1948

2,453,258

UNITED STATES PATENT OFFICE 2,453,258

PRESSURE-SENSITIVE ADHESIVE SHEET

John William Pearson, St. Paul, Minn., assignor to Minnesota Mining & Manufacturing Company, St. Paul, Minn., a corporation of Delaware Application April 6, 1946, Serial No. 660,204

9 Claims. (Cl. 154—136)

This invention relates to pressure-sensitive adhesive tapes and particularly to pressure-sensitive adhesive tapes having a composite non-fibrous backing.

This application is a continuation-in-part of my copending application Serial No. 502,404, filed September 15, 1943, now abandoned.

Many of the advantages of composite backings for pressure-sensitive adhesive tapes have previously been appreciated. Some films are moisture resistant and do not vary greatly in dimensions when exposed to changes in relative humidity, but are weak in tear resistance and are affected by heat and solvents. Others with greater mechanical strength and resistance to heat, are highly susceptible to the action of moisture. Composites of such films may exhibit the advantageous properties of both individual films when used as backings for pressure-sensitive adhesive tapes. The specific adhesion of pressure-sensitive adhesives to various surfaces frequently differs with the chemical nature of the surface, and the use of composite films therefore permits satisfactory bonding of the adhesive to one side while facilitating the removal of the adhesive from the opposite side, as in unwinding the tape from roll form.

The application of a moistureproof film of a material such as cellulose acetate to a tough but moisture-permeable film such as regenerated cellulose may be accomplished by coating the cellulose acetate from solution in an organic solvent. But such coated films may be too thin, or too poorly adherent to the base film, to produce with such film a satisfactory composite backing for a pressure-sensitive adhesive tape. Bonding of a pre-formed film of cellulose acetate to the regenerated cellulose film with an organic solvent type cement requires prolonged drying, may change the dimensions of the acetate film, and is expensive and hazardous due to the nature of the solvent. Where the cement is applied in solution to one film, dried, and then united with the other film as by heat and pressure, it is found that "pockets" or air bubbles are formed between the films which diminish the clarity and uniformity of the finished tape. Thermoplastic cements are difficult to apply in sufficiently thin layers, require heated rolls or spreaders for their application, and in some cases react under continued heating to an infusible stage which cannot be satisfactorily coated. On the other hand, it has been difficult to achieve satisfactory adhesion to moisture-resistant films such as cellulose acetate by the use of water-dispersed cements.

I have now discovered that a satisfactorily strong and flexible bond may be made between a hydrophilic moisture-permeable film such as regenerated cellulose and a hydrophobic film such as cellulose acetate by the use of a soft, pressure-sensitive adhesive cement deposited in situ from an aqueous dispersion, with drying taking place between and in contact with both films; and that the resultant composite backing may be used in the construction of a novel and superior type of pressure-sensitive adhesive tape.

Referring to the drawings, Figure 1 represents a cross-sectional view of a preferred form of pressure-sensitive adhesive tape having a composite backing and a pressure-sensitive eucohesive adhesive. A pressure-sensitive eucohesive adhesive is one which is normally and stably tacky (which sticks without need of activation by solvents or heat) and it is also more cohesive than adhesive. As shown in Figure 1, an outer film 6 of cellulose acetate is bonded to an inner film 7 of regenerated cellulose by means of a soft, pressure-sensitive adhesive cement 8 which has been deposited in situ from an aqueous dispersion; a pressure-sensitive eucohesive adhesive 9 is applied to the other side of the regenerated cellulose film. The designations "inner" and "outer" refer to the respective positions of the two films when the finished tape in use is adhesively attached to a surface.

Figure 2:
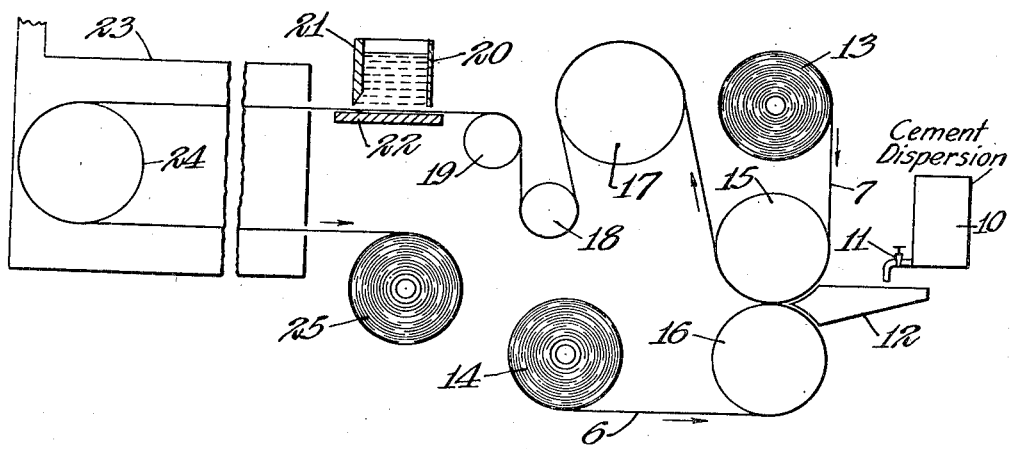

Figure 2 represents a preferred method of making the tape of Figure 1. Cellulose acetate film 6 and regenerated cellulose film 7 are taken from supply rolls 14 and 13 respectively, and are led to and between adjustable squeeze rolls 15 and 16. The cement dispersion from storage tank 10 is allowed to flow through regulating valve 11 to hopper 12 which spreads and distributes the dispersion uniformly between the two films as they pass between the squeeze rolls. Pressure applied by the rolls is sufficient to regulate the amount of dispersion left between the films and is also effective in squeezing out all air bubbles or irregularities in thickness from the cement film. The composite film then passes over the rotatable polished steel drum 17 which is heated internally by means of low pressure steam, and the aqueous vehicle of the cement is thus driven off through the moisture-permeable regenerated cellulose film, which at this point is on the outside, i. e. away from the steel drum, to leave the layer of dry pressure-sensitive cement, as represented by 8 of Figure 1, adhesively attached to both films.

The completed backing is then ready to be coated with the pressure-sensitive eucohesive adhesive. For this purpose it is directed, by guide rolls 18 and 19, into a coating hopper 20, where its upper or regenerated cellulose surface is contacted by a viscous solution of the adhesive in a suitable organic solvent. The coated web is drawn out between doctor blade 21 and bedplate 22 to give a uniform coating of desired thickness, and thence to drying oven 23 for removal of solvent. Roll 24 serves to reverse the direction of the coated tape thus reducing the length of the oven required for complete drying. The tape is finally wound up into a roll at 25, from which it may later be unwound for slitting into narrower widths and winding into rolls, or for other purposes.

In the commercial production of pressure-sensitive adhesive tape corresponding to the disclosure of this invention, the following specific materials and methods were found to result in a satisfactory construction.

Cellulose acetate film of .00088 inch thickness was laminated to regenerated cellulose film of .001 inch thickness ("No. 300 Cellophane") using the water-dispersed cement described below under Example 1 which as used had a solids concentration of 42%. The composite was dried by passing over a steam drum which was held at a surface temperature of between 190 and 245° F. The drum was 16 inches in diameter, and approximately three-fourths of its surface was in contact with the web, which traveled at a rate of between 12 and 16 yards per minute. The dried cement weighed about 6 to 12 grains per square foot, and was approximately .0001 inch in thickness, making a total thickness for the composite of about .002 inch. An increase in the temperature of the steam drum caused excessive curling of the web; on the other hand, a lower temperature did not give sufficient drying, and test samples were not well bonded before entering the adhesive-coating hopper and the drying oven. An adhesive composition corresponding to that of Example 6 described below, and which contained approximately 20% solids, was applied in a thickness which when dried produced an adhesive coating weight of about 50 grains per square foot of tape; the solvent was removed by drying in the oven at a temperature of 100 to 140° F.

Laminating cements which have proven useful in making the novel composite backings of this invention are described in the following 5 examples, in which all parts are by weight.

*Example 1*

|  | Pounds |
|---|---|
| A. Alkyd resin base: | |
| Castor oil | 600 |
| Citric acid (monohydrate crystals) | 120 |
| B. Casein solution: | |
| Casein (dry, powdered) | 50 |
| Water-soluble pentachlorophenol germicide (such as "Dowicide G," sold by Dow Chemical Co.) | 5 |
| Ammonium hydroxide (28% NH₃) | 2.5 |
| Water | 150 |
| C. Cement: | |
| Ester gum (acid number 2–10) | 125 |
| Alkyd resin base produced under "A" | 260 |
| Pale gum rosin (such as "Nelio N" rosin, a light colored gum rosin having an acid number of 155–161, sold by the Glidden Co.) | 37.5 |
| Casein solution produced under "B" | 200 |
| Ammonium hydroxide 28% | 8.0 |
| Water | 500 |

To prepare part "A" of the above formula: Heat the castor oil in a stainless steel kettle or its equivalent to about 350° F., a temperature approximately that of the melting point of citric acid. This serves to drive off any water that may be present in the oil, and also the water liberated on addition of the citric acid.

With constant, and preferably mechanical, stirring of the reaction mass, slowly add the citric acid, meanwhile maintaining the temperature at about 350° F. Water is liberated both by the dehydration of the crystalline monohydrated acid and by the esterification of the oil by the acid. This water tends to cause foaming, which might become violent were the entire amount of acid to be added at one time. On the other hand, unduly prolonged heating before all acid has been added might result in a non-uniform esterification and would be uneconomical. The acid is therefore added as rapidly as possible consistent with the foaming. The acid and water cause corrosion of ordinary iron equipment, resulting in dark colored and lumpy adhesive; hence stainless or corrosion-resistant equipment should be used at this stage.

After all the acid has been added and the foam has subsided, increase the temperature to 385 F. and hold until the desired viscosity has been obtained. A lower temperature might be used, with a corresponding increase in the time required to reach the end point. On the other hand, the temperature might be increased well beyond 385°, but the polymerization reaction then proceeds so rapidly at the end point that the mass sometimes reaches the gel stage before it can be removed from the kettle.

Heating (and stirring) in the kettle is continued until a viscid liquid is produced, at which point the partially reacted alkyd is transferred to a heavy duty internal mixer of the type well known in the rubber industry, such as a Baker-Perkins heavy duty internal mixer, which has previously been heated and charged with the proper weight of ester gum, as listed under part "C." The viscosity of the alkyd at this point (prior to transfer) is preferably within the range of 800–900 centipoise measured at 302° F., which may be measured with a "Synchro-Lectric" viscosimeter, made by the Brookfield Engineering Laboratories of Sharon, Mass. Other viscosities may be used, but lower values result in prolonged reaction time in the internal mixer which is at a lower temperature than that employed in the kettle, while higher values are dangerously close to gel formation at which point transfer of resin to mixer, and mixing of resin and ester gum, is not readily accomplished.

With sufficient steam pressure in the jacket of the internal mixer to produce a batch temperature of 285–300° F., the reaction is allowed to proceed with the mixer open and with continuous working, until the resin has reacted to a tough rubbery gel. The toughness of this gel may be estimated by its appearance under the mixing action of the internal mixer, but preferably is measured on a "Plastograph" recording plasticity measuring device. The "Plastograph" is manufactured by the Brabender Corporation, Rochelle Park, N. J., and as used for this test consists of their small sized mixer with S-shaped blades, operated at 60 R. P. M., with the connection between upper and lower lever arms being so placed that the scale reading in units is three times the actual power input value measured in metergrams. At a value of 650 units on this machine, measured at 212° F., the steam is shut off and cold water turned on in the jacket of the mixer. The pale gum rosin is then added, and cooling is continued for two hours or to a temperature of approximately 170° F.

The casein solution, part "B" of the above formula, is previously prepared as follows: The germicide is first dissolved in three to four times its weight of water. The balance of the water (130 to 135 lbs.) is then added to the dry powdered casein, with vigorous and continuous stirring, to form a slurry. In order to prevent too rapid swelling of the casein, which would prevent adequate mixing, cold water (45–55° F.) is used. To this slurry is added the solution of germicide, and stirring is continued until the mass is well mixed. The entire amount of ammonium hydroxide solution is then added, and stirring continued while the casein swells and until the mass becomes thick and gelatinous. It is then allowed to stand for several hours at room temperature, in order to ensure complete swelling of all the casein, before being added to the internal mixer.

After the two hour cooling period, and with the batch at approximately 170° F., and with continued mixing in the internal mixer, the casein solution is added in approximately 5 lb. portions over a period of approximately one hour. Addition of a portion of casein solution causes the tough rubbery gelatinous resin base to break up into lumps; mixing must be allowed to continue at least until these lumps have again coalesced to form a continuous rubbery mass before further casein is added. At the end of this period, the temperature of the batch should have reached 120–125° F. The ammonium hydroxide (8 lbs.), diluted with 15 lbs. of water, is then slowly added, followed by 25 to 35 lbs. of water, at which point the batch inverts (i. e. changes phase to an oil-in-water type of dispersion). The flow of cooling water in the jacket of the internal mixer is then stopped, a further 15 lbs. of water is added to the batch, and mixing is continued for an additional 30 minutes in order to obtain a smooth dispersion. The balance of the water is then added during about 45 to 60 minutes to produce a finished water-dispersed alkyd resin base cement suitable for the production of laminated backings for pressure-sensitive adhesive tapes.

Example 2

| | |
|---|---|
| Latex crepe rubber | 818 |
| Antioxidant (such as "Flectol H," sold by Monsanto Chemical Co. and described as a condensation product of acetone and aniline) | 12 |
| Pale zinc resinate (such as pale "Zitro" resin, a light colored zinc resinate containing approximately 4.8% combined zinc, sold by Newport Industries, Inc.) | 300 |
| Pale gum rosin | 300 |
| Potassium hydroxide, 50% solution | 25 |
| Casein solution as produced under Example 1—B | 200 |
| Water | 1,000 |

The antioxidant is first milled into 18 parts of the rubber to form a uniform mix for ease of incorporation into the batch. The balance of the rubber is given a preliminary breakdown by milling for approximately 30 minutes on a rubber mill.

A dispersion of the solids in the water was produced by somewhat the same method as used in Example 1, by adding the zinc resinate and pale gum rosin, previously melted together, to the rubber in the internal mixer, then adding the casein solution and potassium hydroxide solution, and inverting to the oil-in-water phase by cautious addition of water, followed by dilution to the final state.

Example 3

| | |
|---|---|
| Rubbery isobutylene polymer (such as "Vistanex Medium," a rubbery isobutylene polymer sold by Advance Solvents and Chemical Corp.) | 600 |
| Heavy liquid paraffin oil | 270 |
| Pale zinc resinate | 105 |
| Pure hydrocarbon thermoplastic terpene resin melting at 25° C. (such as "Piccolyte S-25" resin, sold by Pennsylvania Industrial Chemical Corp.) | 105 |
| Pale gum rosin | 120 |
| Potassium hydroxide, 50% solution | 36 |
| Casein solution as produced under Example 1—B | 240 |
| Water | 800 |

The rubbery isobutylene polymer is first milled for 5 minutes on differential steel rolls, and is then put in a heavy-duty internal mixer. The paraffin oil, zinc resinate, terpene resin, and gum rosin are pre-mixed, preferably with heating, to produce a mixture which is a heavy liquid when cold; this is added slowly to the isobutylene polymer in the internal mixer. Heat is applied, and 150 parts of water are added; the temperature is maintained at 120–125° F. while the casein and potassium hydroxide solutions are added; an additional 50 parts of water then ordinarily produces inversion to the oil-in-water phase, which is followed by dilution.

Example 4

| | |
|---|---|
| Rubber latex (concentrated to 40% rubber content) | 250 |
| Casein (dry, powdered) | 50 |
| Formaldehyde solution (37½%) | 5 |
| Ammonium hydroxide 28% | 10 |
| Water | 200 |

The casein is dissolved in the water with the addition of half of the ammonium hydroxide. This solution is first mixed with the rubber latex; the balance of the ammonium hydroxide solution is added to the formaldehyde solution, and the mixture is then added to the mixed casein and latex.

Example 5

| | |
|---|---|
| Reclaimed rubber (such as an alkali process light carcass reclaim containing 62% rubber hydrocarbon and of 1.20 specific gravity) | 300 |
| Zinc resinate (such as "FF Zitro" resin, containing approximately 4.8 percent combined zinc, sold by Newport Industries, Inc.) | 90 |
| Gum rosin of water-white grade | 60 |
| Potassium hydroxide, 50% solution | 9 |
| Casein solution as produced under Example 1—B | 63 |
| Water | 300 |

The pre-milled reclaimed rubber is hot-mixed in the internal mixer with the zinc resinate; the rosin is added while the mixer is cooled to approximately room temperature; after adding 50 parts of water, first the potassium hydroxide solution, then the casein solution is added slowly; an additional 75 parts of water then causes inversion to the oil-in-water phase, and this is followed by dilution with the balance of the water.

In the following two examples, in which all parts are by weight, adhesive compositions are disclosed which are of particular utility when coated on the composite backings of this invention in the manufacture of pressure-sensitive adhesive tape. These adhesives, and particularly the adhesive of Example 7, are relatively unstable when coated and wound up in roll form on regenerated cellulose films alone. This may be due to an increasing adhesion to the film on continued close contact, or to a chemical effect of the film or plasticizer on the adhesive, or to other causes. Whatever the explanation may be, the fact remains that unwinding of such tapes from roll form results in splitting of the adhesive, and consequent deposition of adhesive on both surfaces of the backing, after only a short period of aging. Use of the composite backing of this invention, in place of regenerated cellulose film alone, will materially increase the useful life of adhesive tapes coated with those adhesives.

*Example 6*

| | |
|---|---|
| Ester gum (acid number 2-10) | 170 |
| Alkyd resin base as prepared under Example 1-A | 850 |
| Ethyl cellulose | 68 |
| Tertiary butyl alcohol | 160 |
| Volatile hydrocarbon solvent (such as "Amsco-Solv A," a hydrocarbon solvent containing sufficient aromatic to give an approximate blending value of 50%, sold by the American Mineral Spirits Company, Chicago, Ill.) | 3,290 |

The ethyl cellulose used is preferably a high-viscosity high-ethoxy type. An illustration is the Hercules Powder Company, "N" type, havng a 35,000-40,000 cps. viscosity, and a 46.8-48.5% ethoxy value. It is dissolved in a mixture of the tertiary butyl alcohol and 1100 parts of the volatile hydrocarbon solvent, by adding the dry granular ethyl cellulose to the mixed solvents with vigorous stirring, continuing the stirring until the ethyl cellulose swells and forms a stiff gel, and then allowing the mass to stand at room temperature for at least twelve hours.

The alkyd resin base and ester gum are heated in the heavy duty internal mixer with continuous mixing as for Example 1, and to the same end point as determined by the "Plastograph" reading. The mass is then cooled, by means of cooling water in the jacket of the mixer, to a temperature not much greater than the initial boiling point of the volatile hydrocarbon solvent, which ordinarily will require three hours for a batch totalling about 1000 lbs. The remaining 2190 parts of the solvent is then added, slowly and with continued mixing so as to maintain a desirable uniformity and to prevent the accumulation of undissolved lumps. To this solution or dispersion is now added the solution of ethyl cellulose, either in the internal mixer or preferably in a simple churn mixer. Additional solvent may also be added at this point, where necessary or desirable in obtaining a viscosity suitable for coating.

*Example 7*

The alkyd resin as produced under Example 1-A is further heated in the internal mixer with continued mixing until it sets up to a firm gel stage and finally reaches a crumbly stage. It is then cooled, during which process the crumbs, under the continued action of the mixer, again cohere to produce an exceedingly tough, rubbery mass which is then dissolved or dispersed in a solvent such as "Amsco-Solv B," a higher-boiling solvent fraction otherwise similar to "Amsco-Solv A."

Polyvinyl butyral resin, such as "Butvar" resin sold by Monsanto Chemical Co., is dissolved in tertiary butyl alcohol to make a 10% solution. Sufficient of this solution is then added to the solution of alkyl resin to furnish 8 parts of polyvinyl butyral resin for each 100 parts of alkyd resin, and the mixture is well blended, and further diluted if desired, in a suitable churn or other mixer.

Various other pressure-sensitive eucohesive adhesives may be used with my composite backings. For example, adhesives based on rubber, polyisobutylene, polymerized acrylates, and various other eupolymers may be used. Hydrophilic moisture-permeable films other than regenerated cellulose may be used; polyvinyl alcohol, casein, and methyl cellulose films are examples. Various hydrophobic films may also be used, such as cellulose nitrate, ethyl cellulose, rubber hydrochloride, cellulose acetobutyrate, polyvinyl chloride, polyvinyl acetate, varnish, and metal foil.

Since specific adhesion between the surface of an adhesive mass and the surface of a film depends on the chemical nature of both surfaces, it follows that selection may be made of both the films and the adhesive to provide combinations of maximum utility in the adhesive tape of my invention. For example, a rubber base adhesive adheres strongly to rubber hydrochloride films but less strongly to regenerated cellulose film; a tape construction including the latter as the outer film, a cement such as that of Example 5 as the bonding agent, a rubber hydrochloride inner film, and a rubber base pressure-sensitive eucohesive adhesive, may therefore be produced which may be more readily unwound from roll form than a tape in which the same adhesive is used, for example, with the rubber hydrochloride film by itself.

The adhesive cements used in the bonding of these composite backings are sufficiently soft, tacky, and flexible as to produce and maintain an effective bond to both films, even at somewhat reduced temperatures and under severe unwinding conditions such as the rapid unwinding of tape from the roll by jerking of the free end of the tape. At the same time they are sufficiently high in internal strength so that unwinding of the tape from the roll at or somewhat above room temperature and at slow speed does not cause the films to pull apart due to excessive flowing or "stringing" of the cement.

The use of a high percentage of casein in the cement of Example 1 has been found to contribute both to the adhesion of the cement to regenerated cellulose and similar films, and to the cohesive strength of the cement itself. The amount of casein or other colloidal agglutinant may, however, be greatly reduced, as to 3-4% based on the solids, or even omitted entirely, where other polymers having greater internal strength and adequate adhesion are employed in place of the alkyd resin of this example. Furthermore, tanning or curing agents such as the formaldehyde of Example 4 may be employed where desired, to convert the casein to a water-resistant form and thereby to produce a tape having improved usefulness in the presence of high humidity.

Water-dispersed adhesive cements coated on a single surface and dried in contact with the air frequently dry out to a non-tacky condition, probably due to migration of the water-soluble constituents to the surface as the water is evaporated therefrom. Such a film cannot then be adhesively secured to a second film, due to the masking effect of the surface layer. The application of the dispersion between the two films, so that both films are wet by the dispersion, followed by drying between and in contact with the films (preferably by the heating of the composite on the steam drum as in the present invention, which presumably temporarily softens the adhesive cement and permits of still more intimate contact), produces a superior bond between film and cement which effectively resists the forces established in unwinding the finished tape from roll form.

The casein of the foregoing laminating cement compositions may be replaced in whole or in part, or augmented, by other hydrophilic colloidal agglutinants, such as isinglass, gelatine, soy bean protein glues, corn prolamine ("Mazein"), dextrin, methyl cellulose, polyvinyl alcohol, etc., which likewise function as protective colloids in stabilizing the dispersion and which, because of affinity for the surface of the hydrophilic film, may be used to increase the bond strength of the cement to such surface.

By the processes of my invention I am thus enabled to produce a pressure-sensitive adhesive tape having a composite backing which, due to the absence of air bubbles or irregularities in the cement coating, may be made clear and transparent, which requires the use of no costly, explosive, nor hazardous solvents, which is easily produced in a continuous web, and which has the advantages of each of the separate films employed together with the additional advantage of differential adhesion to a given adhesive.

Having described various embodiments of my invention for purposes of illustration, but without intent to be limited thereto, what I claim is as follows:

1. A pressure-sensitive adhesive sheet having a composite film backing and a pressure-sensitive eucohesive adhesive coating on one surface thereof, said composite backing comprising a preformed hydrophobic film, a preformed hydrophilic moisture-permeable film, and an interposed thin film of pressure-sensitive adhesive cement which bonds the two films together and which has been deposited in situ from an aqueous dispersion thereof dried between and in contact with both films, said adhesive sheet being unwindable from rolls thereof without delamination and without offsetting of adhesive.

2. An adhesive sheet according to claim 1 in which the hydrophobic film is cellulose acetate.

3. An adhesive sheet according to claim 1 in which the hydrophilic moisture-permeable film is regenerated cellulose.

4. An adhesive sheet according to claim 1 in which the hydrophobic film is cellulose acetate and the hydrophilic film is regenerated cellulose and the adhesive coating is on the regenerated cellulose film side.

5. A pressure-sensitive adhesive sheet according to claim 1 in which the pressure-sensitive adhesive cement includes a hydrophilic colloidal agglutinant.

6. A pressure-sensitive adhesive sheet according to claim 1 in which the elements thereof are transparent such that the adhesive sheet is transparent.

7. A method for the production of pressure-sensitive adhesive sheets which includes the steps of applying a thin uniform layer of an aqueous dispersion of a pressure-sensitive adhesive cement between a preformed hydrophobic film and a preformed hydrophilic moisture-permeable film, drying the cement between and in contact with both films, and applying a pressure-sensitive eucohesive adhesive to one surface of the aforesaid composite film structure.

8. The method of claim 7 in which the drying of the cement is accomplished by a heated roller surface around which the films are pulled under tension sufficient to prevent wrinkling and to produce pressure on the cement layer.

9. The method of making a clear, transparent, pressure-sensitive adhesive tape which is easily unwound from roll form without offsetting of adhesive to the outer surface of the tape backing even after long aging, which includes the steps of applying a thin uniform layer of a water dispersion of a pressure-sensitive adhesive cement between and in contact with a film of cellulose acetate and a film of regenerated cellulose, passing the combination over a smooth heated drum or roller with the cellulose acetate surface in contact therewith, and under a tension sufficient to maintain the combination web in an essentially smooth unwrinkled condition and also to exert pressure on the cement, maintaining the web in contact with the heated drum until essentially all free water is driven from the web, cooling the web, and applying a coating of a pressure-sensitive eucohesive adhesive to the outer regenerated cellulose surface of the composite web.

JOHN WILLIAM PEARSON.

REFERENCES CITED

The following references are of record in the file of this patent:

UNITED STATES PATENTS

| Number | Name | Date |
| --- | --- | --- |
| 1,826,696 | Charch et al. | Oct. 6, 1931 |
| 2,142,039 | Abrams et al. | Dec. 27, 1938 |
| 2,183,330 | Drew | Dec. 12, 1939 |
| 2,276,151 | Brandenberger | Mar. 10, 1942 |
| 2,364,875 | Scheiman | Dec. 12, 1944 |

FOREIGN PATENTS

| Number | Country | Date |
| --- | --- | --- |
| 344,469 | Great Britain | Mar. 22, 1931 |